(12) United States Patent
Welch et al.

(10) Patent No.: US 10,782,543 B2
(45) Date of Patent: Sep. 22, 2020

(54) METHOD AND SYSTEM FOR A DISTRIBUTED MACH-ZEHNDER INTERFEROMETER WITH INTEGRATED FEED FORWARD EQUALIZER

(71) Applicant: Luxtera, Inc., Carlsbad, CA (US)

(72) Inventors: Brian Welch, San Diego, CA (US); Scott Denton, Carlsbad, CA (US); Joseph Balardeta, Encinitas, CA (US); Simon Pang, San Diego, CA (US)

(73) Assignee: Luxtera LLC, Wilmington, DE (US)

( * ) Notice: Subject to any disclaimer, the term of this patent is extended or adjusted under 35 U.S.C. 154(b) by 89 days.

(21) Appl. No.: 16/005,233

(22) Filed: Jun. 11, 2018

(65) Prior Publication Data
US 2018/0356655 A1   Dec. 13, 2018

Related U.S. Application Data

(60) Provisional application No. 62/517,865, filed on Jun. 10, 2017.

(51) Int. Cl.
| | |
|---|---|
| *H04B 10/50* | (2013.01) |
| *G02F 1/01* | (2006.01) |
| *G02F 1/225* | (2006.01) |
| *G02F 1/21* | (2006.01) |

(52) U.S. Cl.
CPC .......... *G02F 1/0123* (2013.01); *G02F 1/2252* (2013.01); *H04B 10/501* (2013.01); *H04B 10/50595* (2013.01); *G02F 2001/212* (2013.01)

(58) Field of Classification Search
CPC ................ G02F 1/0123; G02F 1/2252; G02F 2001/212; H04B 10/501; H04B 10/50595
See application file for complete search history.

(56) References Cited

U.S. PATENT DOCUMENTS

| | | | |
|---|---|---|---|
| 10,128,957 B2* | 11/2018 | Welch | .................. H04B 10/516 |
| 10,425,165 B1* | 9/2019 | Welch | ................ H04B 10/5055 |
| 2018/0341164 A1* | 11/2018 | Williams | .............. G02F 1/2255 |

* cited by examiner

*Primary Examiner* — Leslie C Pascal
(74) *Attorney, Agent, or Firm* — Patterson + Sheridan, LLP

(57) ABSTRACT

Methods and systems for a distributed Mach-Zehnder Interferometer (MZI) with an integrated feed forward equalizer (FFE) may include a photonic chip comprising an optical modulator having diode drivers, local voltage domain splitters, and delay elements, where each is distributed along a length of the optical modulator. Outputs of the delay elements may be coupled to inputs of the local domain splitters, and outputs of the local voltage domain splitters may be coupled to inputs of the diode drivers. A feed forward equalization (FFE) module comprising a configurable delay element with inverted outputs coupled to one of the delay elements along the length of the modulator, may be coupled to a local voltage domain splitter. An input electrical signal may be received and delayed using the delay elements and coupled to the local domain splitters, and input electrical signals for the diode drivers may be generated using the local domain splitters.

20 Claims, 9 Drawing Sheets

METHOD AND SYSTEM FOR A DISTRIBUTED MACH-ZEHNDER INTERFEROMETER WITH INTEGRATED FEED FORWARD EQUALIZER

CROSS-REFERENCE TO RELATED APPLICATIONS/INCORPORATION BY REFERENCE

This application claims priority to and the benefit of U.S. Provisional Application 62/517,865 filed on Jun. 10, 2017, which is hereby incorporated herein by reference in its entirety.

FIELD

Aspects of the present disclosure relate to electronic components. More specifically, certain implementations of the present disclosure relate to methods and systems for a distributed Mach-Zehnder Interferometer (MZI) with integrated feed forward equalizer (FFE).

BACKGROUND

Conventional approaches for optical modulators may be costly, cumbersome, and/or inefficient—e.g., they may be complex and/or costly, and/or may introduce asymmetry.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for a distributed Mach-Zehnder Interferometer (MZI) with integrated feed forward equalizer (FFE), substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1A:
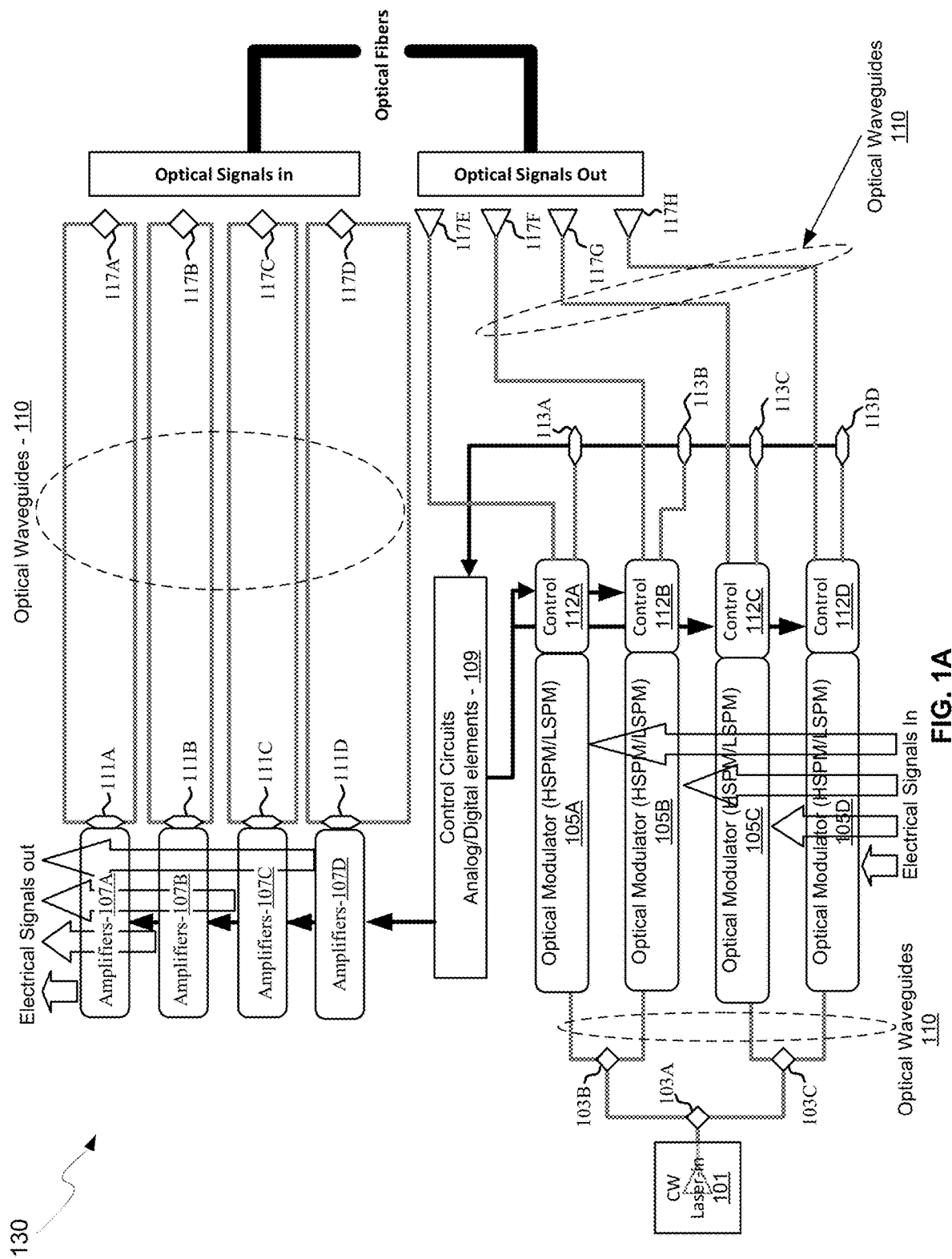
FIG. 1A is a block diagram of a photonically-enabled integrated circuit with distributed Mach-Zehnder Interferometers with integrated feed forward equalizers, in accordance with an example embodiment of the disclosure.

FIG. 1A is a block diagram of a photonically-enabled integrated circuit with distributed Mach-Zehnder Interferometers with integrated feed forward equalizers, in accordance with an example embodiment of the disclosure. Referring to FIG. 1A, there are shown optoelectronic devices on a photonically-enabled integrated circuit 130 comprising optical modulators 105A-105D, photodiodes 111A-111D, monitor photodiodes 113A-113H, and optical devices comprising couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators, for example, within the assembly for directing one or more CW optical signals to the coupler 103A. The photonically enabled integrated circuit 130 may comprise a single chip, or may be integrated on a plurality of die, such as with one or more electronics die coupled to one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical power splitter may comprise at least one input waveguide and at least two output waveguides. The couplers 103A-103C shown in FIG. 1A illustrates 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the many Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction must be carefully optimized.

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

In an example embodiment of the disclosure, each of the modulators 105A-105D may comprise one or more integrated feed forward equalizers (FFE). Optical waveform shaping of optical signals in modulators becomes more difficult as baud rates increase. Achieving high bandwidth transmitter via linear techniques is increasingly difficult and/or power hungry. An FFE may be integrated as part of the optical transmitter via delayed/inverted unit drivers in the modulators 105A-105D where the tap weight may be a function of the relative area of the modulators 105A-105D. This allows for more control on transmitter waveform shape to ensure low Transmitter Dispersion Penalty/Transmitter Dispersion Eye Closure Quaternary (TDP/TDECQ) values and create transmitter pre-emphasis to compensate reduced bandwidth receivers and also provides less noise amplification than receiver side equalization.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
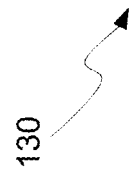
FIG. 1B is a diagram illustrating an exemplary photonically-enabled integrated circuit, in accordance with an example embodiment of the disclosure.
Figure 1B:
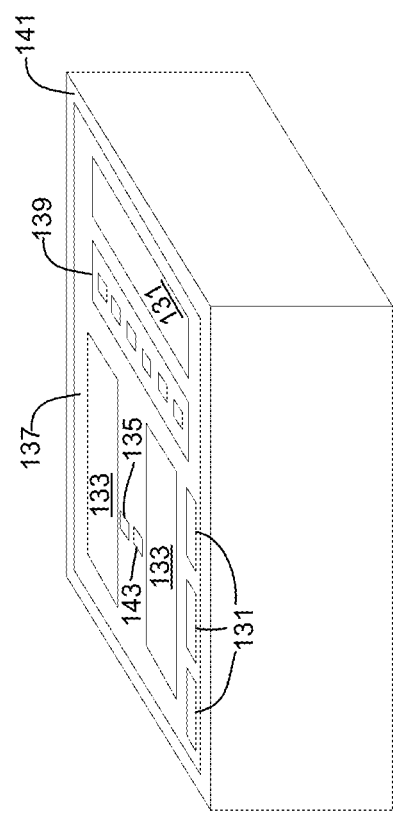

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113I.

Figure 1C:
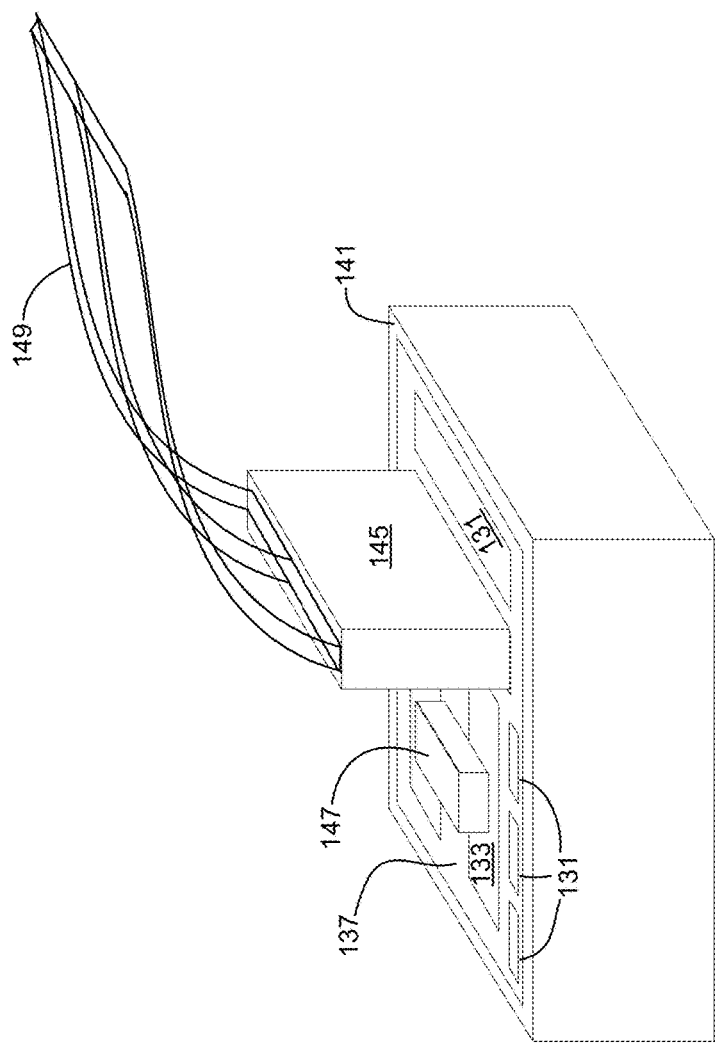
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B, for example.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130.

Figure 2:
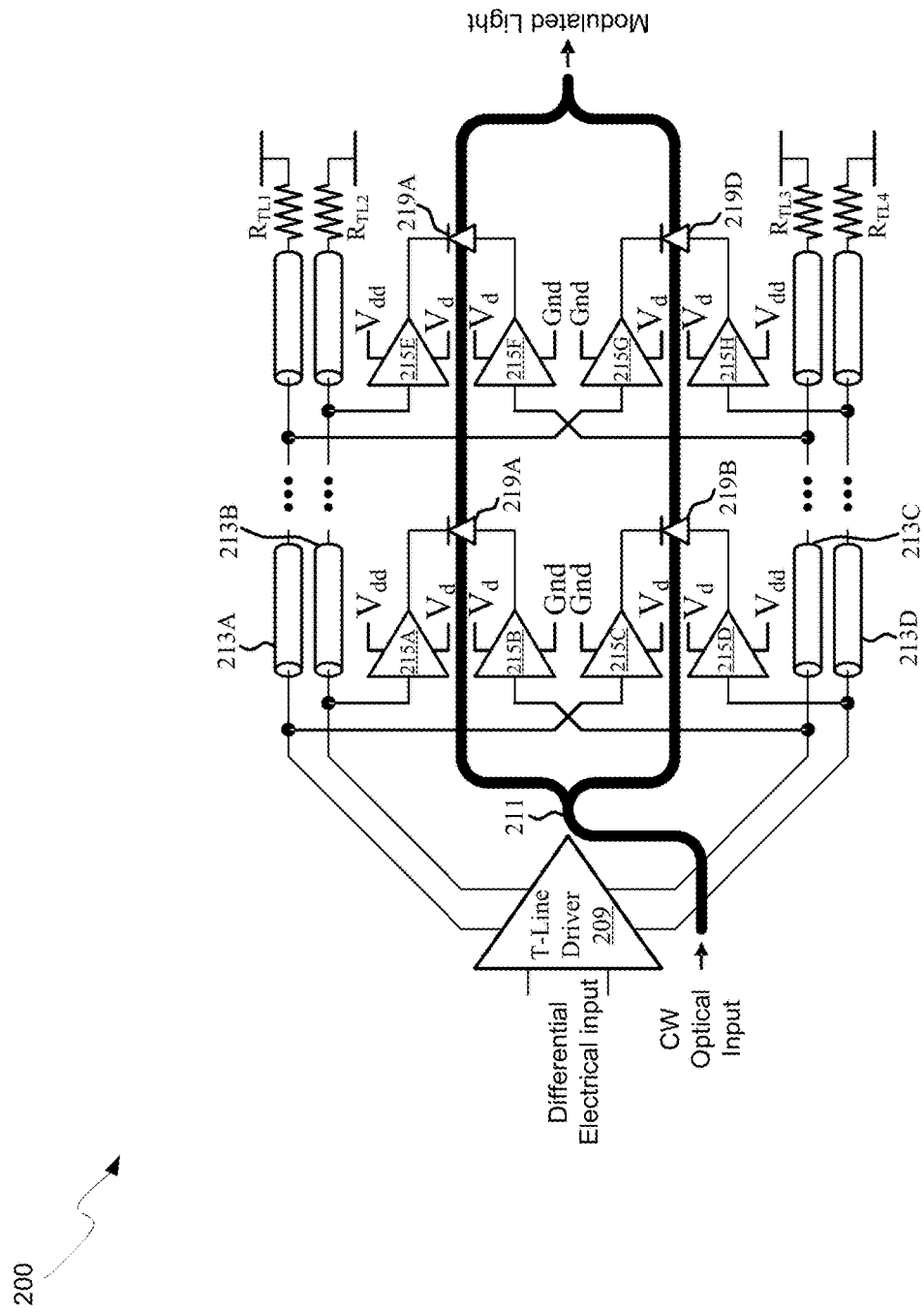
FIG. 2 is a block diagram of a split domain Mach-Zehnder modulator with global domain splitting, in accordance with an example embodiment of the disclosure.

FIG. 2 is a block diagram of a split domain Mach-Zehnder modulator with global domain splitting, in accordance with an example embodiment of the disclosure. Referring to FIG. 2, there is shown a split-domain Mach-Zehnder modulator (MZM) 200 comprising a transmission line driver 209, waveguides 211, transmission lines 213A-213D, diode drivers 215A-215H, diodes 219A-219D, and transmission line termination resistors $R_{TL1}$-$R_{TL4}$. There are also shown voltage levels $V_{dd}$, $V_d$, and Gnd. In an example scenario, $V_d$ is equal to a voltage of $V_{dd}/2$, thus generating two voltage domains, due to the symmetric nature of the stacked circuits of the transmission line driver 209. However, the disclosure is not limited to two voltage domains. Accordingly, any number of voltage domains may be utilized, depending for example on the desired voltage swing of each domain and the total voltage range, defined here as $V_{dd}$ to ground. Similarly, the magnitude of the voltage range in each voltage domain may be a different value than other domains.

The transmission line (T-line) driver 209 comprises circuitry for driving transmission lines in an even-coupled mode, where the signal on each pair of transmission lines is equal except with a DC offset. In this manner, two or more voltage domains may be utilized to drive the diodes that generate index changes in the respective branches of the MZM 200. In another embodiment, the T-line driver 209 may drive transmission lines in odd-coupled mode. Even-coupled mode may result in a higher impedance in the transmission line, whereas odd-coupling may result in lower impedance.

The waveguides 211 comprise the optical components of the MZM 200 and enable the routing of optical signals around the CMOS chip 130. The waveguides 211 comprise for example silicon and silicon dioxide, formed by CMOS fabrication processes, utilizing the index of refraction difference between Si and $SiO_2$ to confine an optical mode in the waveguides 211. The transmission line termination resistors $R_{TL1}$-$R_{TL4}$ enable impedance matching to the T-lines 213A-213D and thus reduced reflections.

The diode drivers 215A-215H comprise circuitry for driving the diodes 219A-219D, which changes the index of refraction locally in the waveguides 211. This index change in turn changes the velocity of the optical mode in the waveguides 211, such that when the waveguides merge again following the driver circuitry, the optical signals interfere constructively or destructively, thus modulating the laser input signal. By driving the diodes 219A-219D with a differential signal, where a signal is driven at each terminal of a diode, as opposed to one terminal being tied to AC ground, both power efficiency and bandwidth may be increased due to the reduced voltage swing required in each domain.

In operation, a CW, or unmodulated, optical signal may be coupled into the "CW optical Input", and a modulating differential electrical signal is communicated to the T-line driver 209. The T-line driver 209 generates complementary electrical signals to be communicated over the T-lines 213A-213D, with each pair of signals offset by a DC level to minimize the voltage swing of each diode driver 215A-215H, while still enabling a full voltage swing across the diodes 219A-219D.

Reverse biasing the diodes 219A-219D generates field effects that change the index of refraction and thus the speed of the optical signal propagating through the waveguides 213A-213D. The optical signals then interfere constructively or destructively, resulting in the "Modulated Light" output signal.

Figure 3:
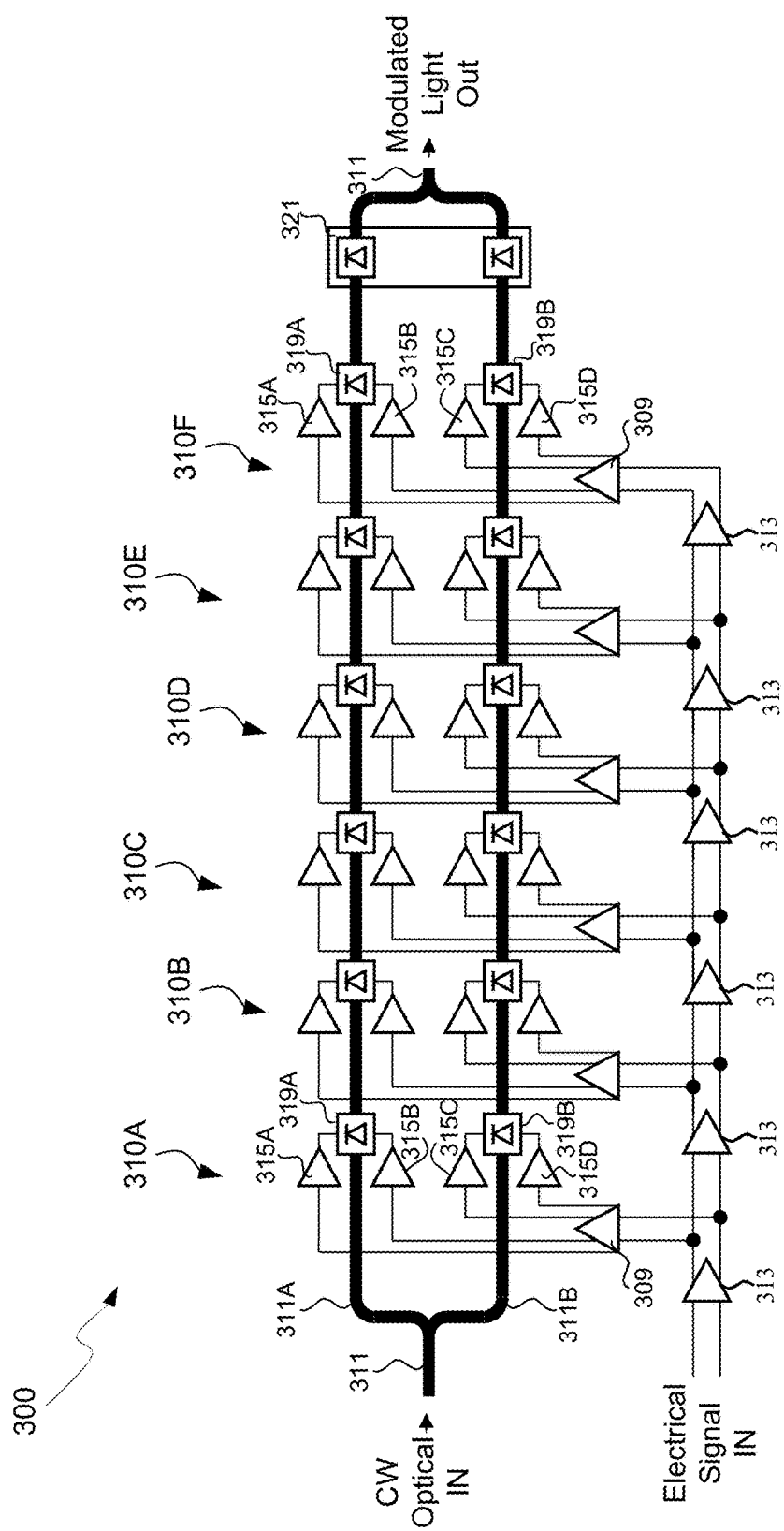
FIG. 3 illustrates a split domain Mach-Zehnder modulator with local domain splitting, in accordance with an example embodiment of the disclosure.

FIG. 3 illustrates a split domain Mach-Zehnder modulator with local domain splitting, in accordance with an example embodiment of the disclosure. Referring to FIG. 3, there is shown a locally split-domain Mach-Zehnder modulator (MZM) 300 comprising waveguides 311/311A, delay lines 313, a phase calibrator 321, and local modulator sections 310A-310F, each of which comprises a local voltage domain splitter 309, diode drivers 315A-315D, and diodes 319A and 319B. Only the first and last instances of some repeating elements are labeled in FIG. 3 for clarity.

In an example scenario, each of the local voltage domain splitters 309 may generate two voltage domains for controlling the diode drivers 315A-315D, which in turn drive the diodes 319A and 319B. The voltage domains may be symmetric about a voltage, $V_d$, which in an example scenario may be equal to a voltage of $V_{dd}/2$, thus generating two voltage domains within a supply voltage $V_{dd}$. However, the disclosure is not limited to two voltage domains. Accordingly, any number of voltage domains may be utilized, depending for example on the desired voltage swing of each domain and the total voltage range, defined here as $V_{dd}$ to ground. Similarly, the magnitude of the voltage range in each voltage domain may be a different value than other domains.

The waveguides 311, 311A, and 311B comprise the optical components of the MZM 300 and enable the routing of optical signals around the CMOS chip 130. The waveguides 311, 311A, and 311B comprise for example silicon and silicon dioxide, formed by CMOS fabrication processes, utilizing the index of refraction difference between Si and $SiO_2$ to confine an optical mode in the waveguides 311, 311A, and 311B.

The six sets of diode drivers 315A-315D may comprise circuitry for driving the diodes 319A and 319B, which changes the index of refraction locally in the waveguides 311A and 311B. This index change in turn changes the velocity of the optical mode in the waveguides 311A and 311B, such that when the waveguides merge again into the single waveguide 311 following the driver circuitry, the optical signals interfere constructively or destructively, thus modulating the laser input signal, CW optical IN. By driving the sets of diodes 319A and 319B with a differential signal, where a signal is driven at each terminal of a diode, as opposed to one terminal being tied to AC ground, both power efficiency and bandwidth may be increased due to the reduced voltage swing required in each domain.

Figure 5:
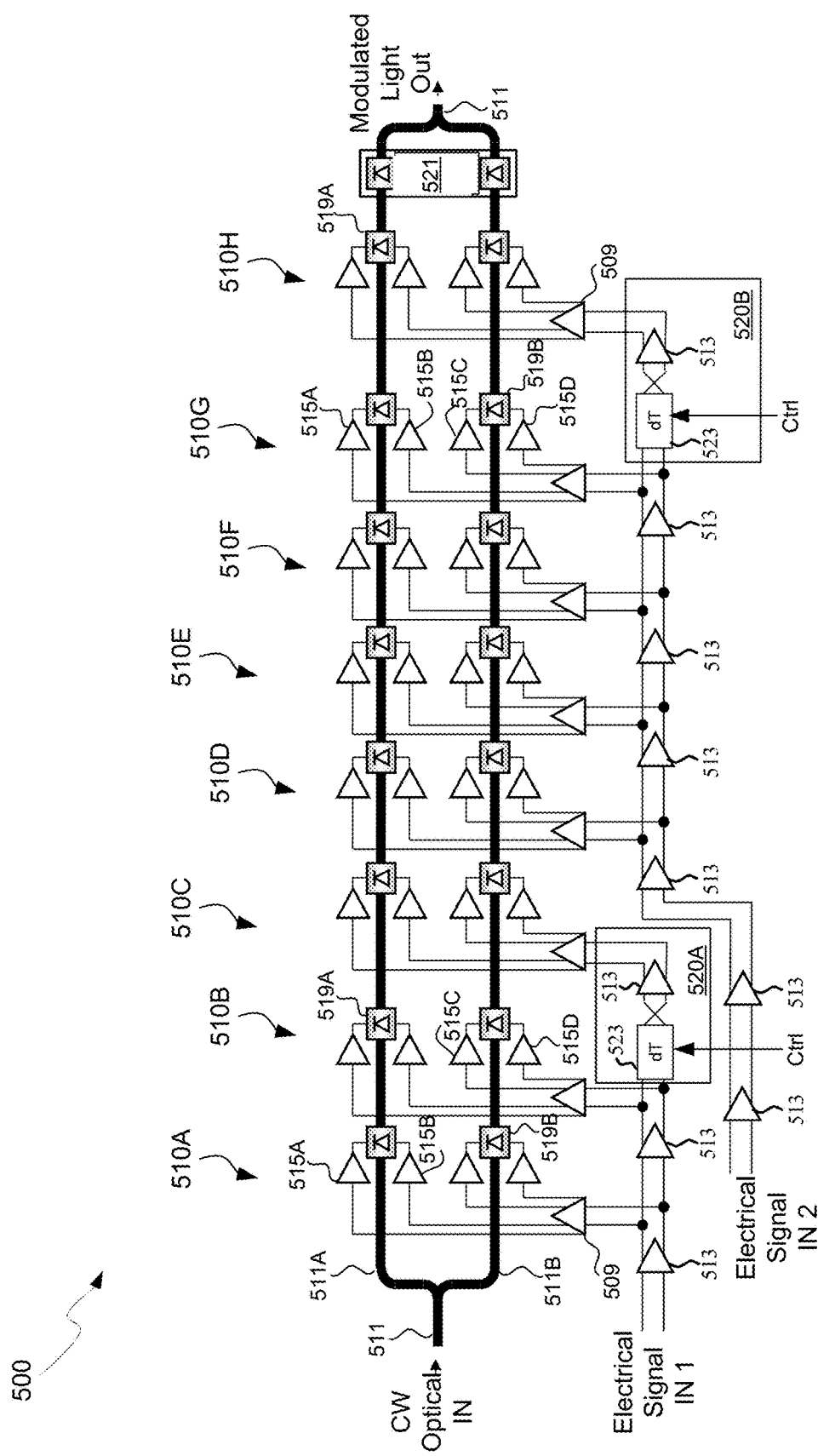
FIG. 5 illustrates a PAM-4 implementation of a split domain Mach-Zehnder modulator with a feed forward equalizer, in accordance with an example embodiment of the disclosure.

The phase calibrator 321 may comprise individually addressable diodes in each waveguide 311A and 311B that may be operable to adjust the phase delay of the optical signal travelling in the waveguides 311A and 311B. The delay elements 313 may comprise CMOS delay elements, such as inverters or buffers, for example, for configuring the time delay of electrical signals to each of the local modulator sections 310A-310F. In the example shown in FIG. 3, the delay elements receive a single input for the series-connected delay elements. Other configurations are possible, as illustrated by FIG. 5, for example.

In operation, a CW, or unmodulated, optical signal may be coupled into the "CW optical In" input, and a modulating differential electrical signal may be coupled to the "Electrical Signal IN" input. The received electrical signal may then be communicated to the local modulator sections 310A-310F via the delay elements 313.

The local voltage domain splitters 309 may generate output signals offset from each other by a DC level to minimize the voltage swing of each diode driver 315A-315D, while still enabling a full voltage swing across the diodes 319A and 319B in each modulator section 310A-310F. In an example scenario, each of the local voltage domain splitters 309 may receive a differential input signal and generate two differential output signals.

In an example scenario, the domain splitters may comprise a pair of stacked of NFET and PFET source follower circuits, where a drain of one NFET coupled to a drain of one of the PFETs are coupled to a voltage domain boundary so that each pair then operates in a different voltage domain. Such a circuit is described in further detail in U.S. application Ser. No. 14/922,916, which is incorporated herein by reference in its entirety.

Reverse biasing the diodes 319A and 319B generates field effects that change the index of refraction and thus the speed of the optical signal propagating through the waveguides 311A. The optical signals then interfere constructively or destructively, resulting in the "Modulated Light" signal, which may comprise a non-return-to-zero (NRZ) signal, for example.

Figure 4:
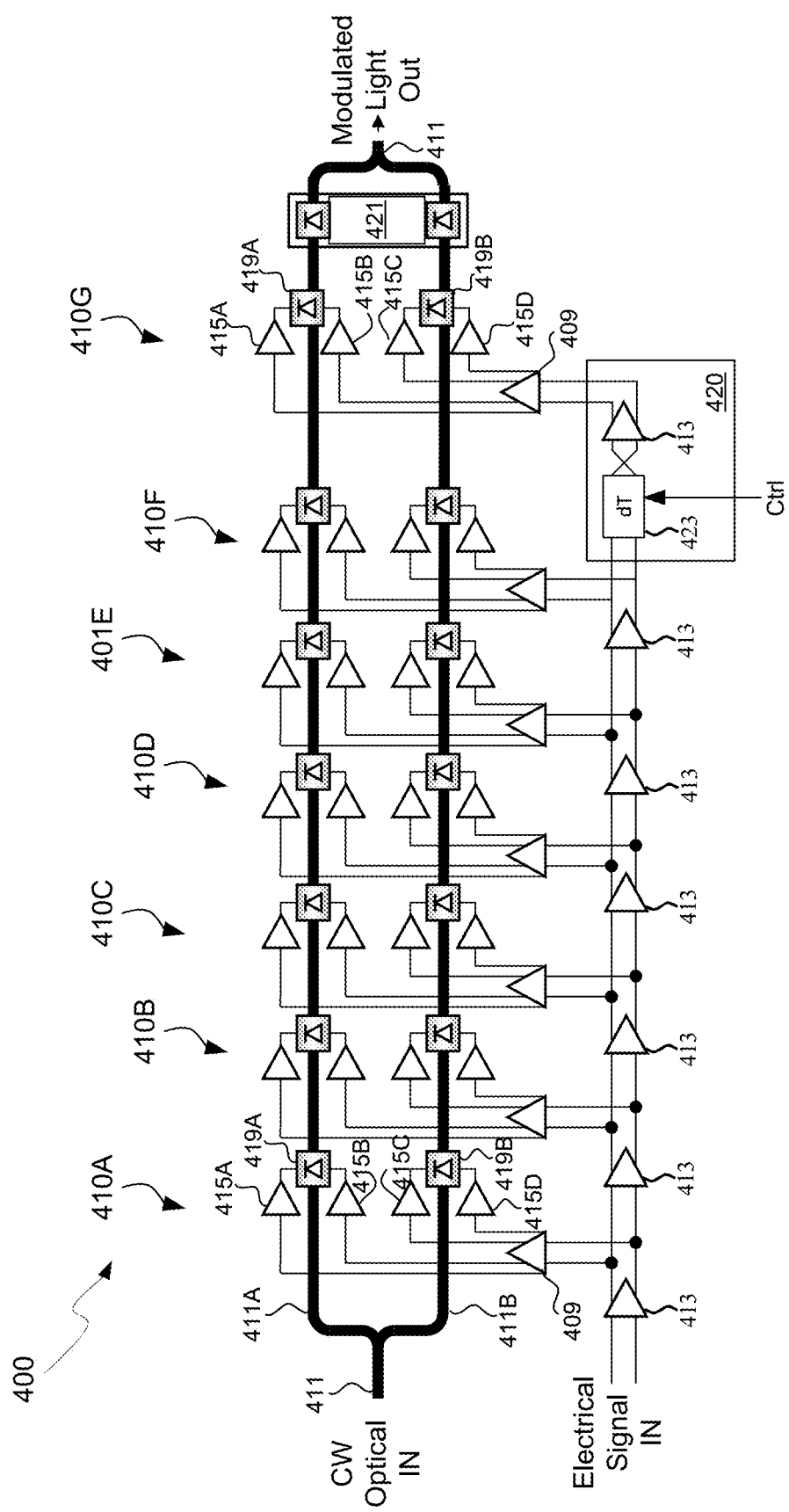
FIG. 4 illustrates a split domain Mach-Zehnder modulator with a feed forward equalizer, in accordance with an example embodiment of the disclosure.

FIG. 4 illustrates a split domain Mach-Zehnder modulator with a feed forward equalizer, in accordance with an example embodiment of the disclosure. Referring to FIG. 4, there is shown a split domain MZI 400 comprising local modulator sections 410A-410G, each comprising a pair of diodes 419A and 419B, and diode drivers 415A-415D. Only the first and last instances of some repeating elements are labeled in FIG. 4 for clarity. The MZI 400 comprises an FFE module 420 comprising a configurable delay 423 with its outputs inverted before coupling to a final delay 413.

In an example scenario, each of the local voltage domain splitters 409 may generate two voltage domains for controlling the diode drivers 415A-415D, which in turn drive the diodes 419A and 419B. The voltage domains may be symmetric about a voltage, $V_d$, which in an example scenario may be equal to a voltage of $V_{dd}/2$, thus generating two voltage domains within a supply voltage $V_{dd}$. However, the disclosure is not limited to two voltage domains. Accordingly, any number of voltage domains may be utilized, depending for example on the desired voltage swing of each domain and the total voltage range, defined here as $V_{dd}$ to ground. Similarly, the magnitude of the voltage range in each voltage domain may be a different value than other domains.

The waveguides 411, 411A, and 411B comprise the optical components of the MZM 400 and enable the routing of optical signals around the CMOS chip 130. The waveguides 411, 411A, and 411B comprise for example silicon and silicon dioxide, formed by CMOS fabrication processes, utilizing the index of refraction difference between Si and $SiO_2$ to confine an optical mode in the waveguides 411, 411A, and 411B.

The seven sets of diode drivers 415A-415D may comprise circuitry for driving the diodes 419A and 419B, which changes the index of refraction locally in the waveguides 411A and 411B. This index change in turn changes the velocity of the optical mode in the waveguides 411A and 411B, such that when the waveguides merge again into the single waveguide 411 following the driver circuitry, the optical signals interfere constructively or destructively, thus modulating the laser input signal, CW optical IN. By driving the sets of diodes 419A and 419B with a differential signal, where a signal is driven at each terminal of a diode, as opposed to one terminal being tied to AC ground, both power efficiency and bandwidth may be increased due to the reduced voltage swing required in each domain.

The phase calibrator 421 may comprise individually addressable diodes in each waveguide 411A and 411B that may be operable to adjust the phase delay of the optical signal travelling in the waveguides 411A and 411B. The delay elements 413 may comprise CMOS delay elements, such as inverters or buffers, for example, for configuring the time delay of electrical signals to each of the local modulator sections 410A-410G. In the example shown in FIG. 4, the delay elements receive a single input for the series-connected delay elements. Other configurations are possible, as illustrated by FIG. 5, for example.

The MZM 400 is similar to that shown in FIG. 3, but with the last 410G of inverters and drivers receiving its electrical driving signal from the FFE module 420, which comprises the configurable delay 423 with outputs switched before being coupled to the last delay stage 413. In this manner, feed-forward equalization may be incorporated in the MZM 400.

Feed-forward equalization operates by adding a delayed, inverted, weighted copy of a signal back into itself. The delay may typically be 1 unit interval (UI) (T-Spaced) or 0.5 UI (T/2-Spaced), and the net effect is de-emphasis such that the signal looks peaked by the attenuation of the steady state 1/0 level shortly after the transition. The delay may be analog or digital, and an advantage of this configuration is that the segments of the MZI 400 are used as the modulation/weighting/summing elements.

In operation, a CW, or unmodulated, optical signal may be coupled into the "CW optical In" input, and a modulating differential electrical signal may be coupled to the "Electrical Signal IN" input. The received electrical signal may then be communicated to the local modulator sections 410A-410G via the delay elements 413. The final stage 410G comprises FFE module 420 comprising the configurable delay 423 and a delay element 413. The configurable delay 423 may receive a control signal from control electronics such as the control sections 112A-112D and/or the control circuits 109, for example, that may adjust the delay applied to the input signal to the FFE module 420.

Figure 6:
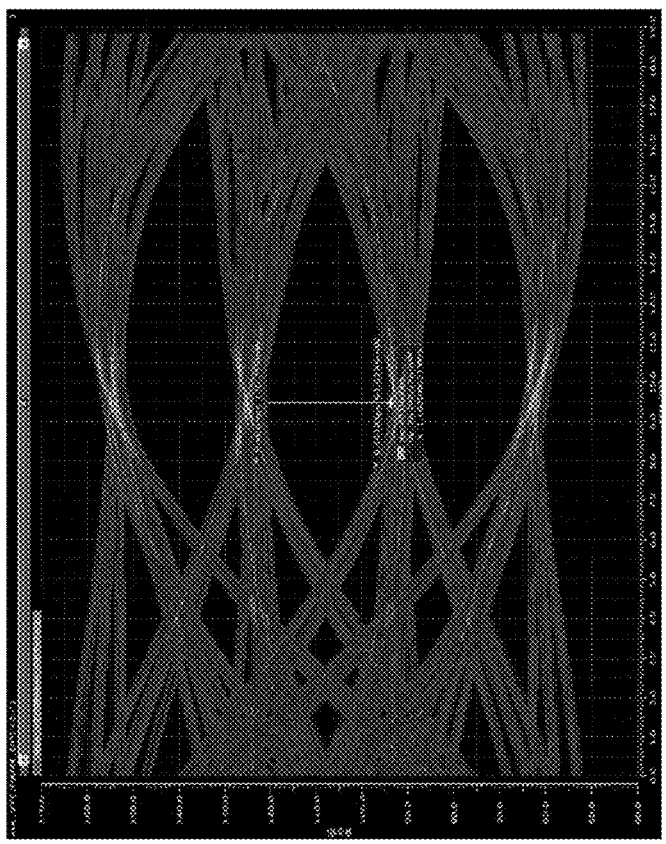
FIG. 6 illustrates a performance comparison of Mach-Zehnder Interferometer modulators with and without an integrated FFE, in accordance with an example embodiment of the disclosure.
Figure 6:
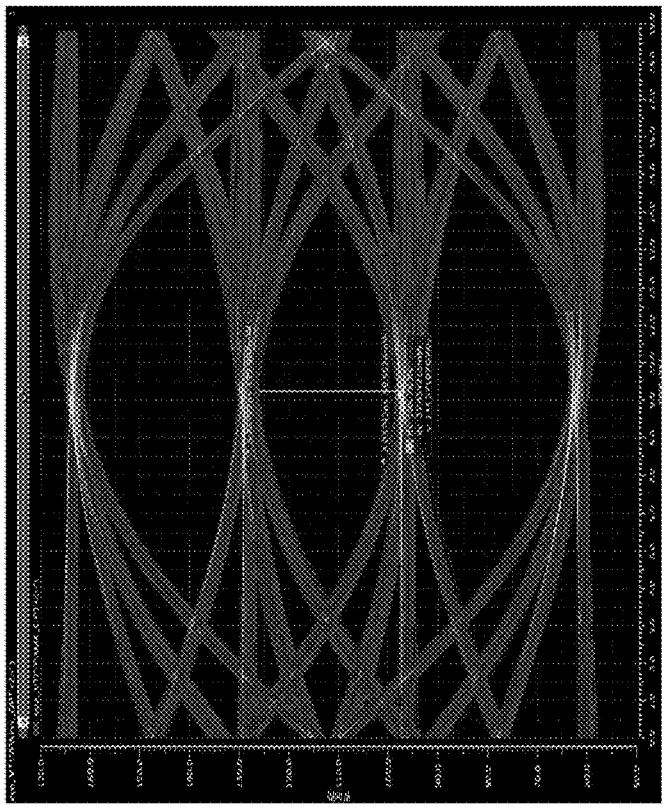
Figure 7:
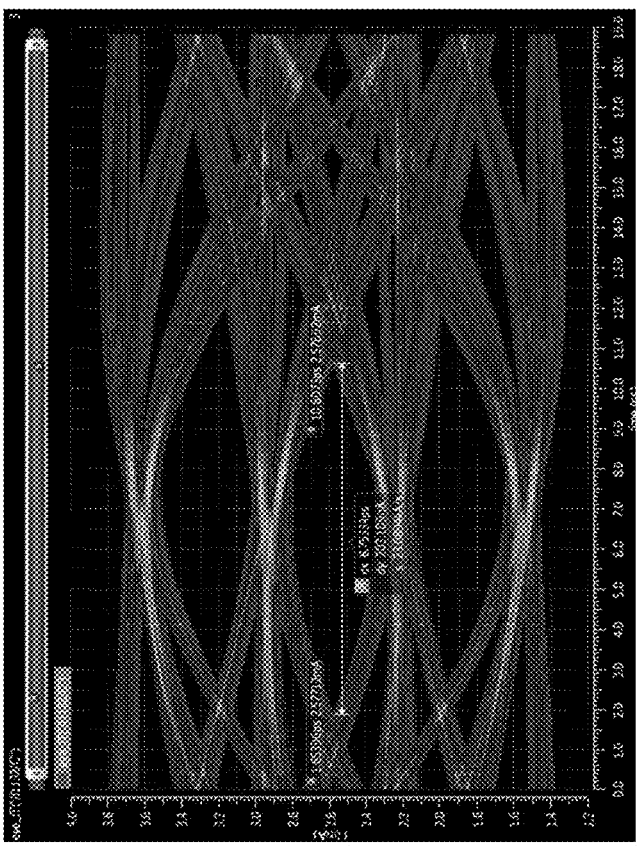
FIG. 7 illustrates another performance comparison of Mach-Zehnder Interferometer modulators with and without an integrated FFE, in accordance with an example embodiment of the disclosure.
Figure 7:
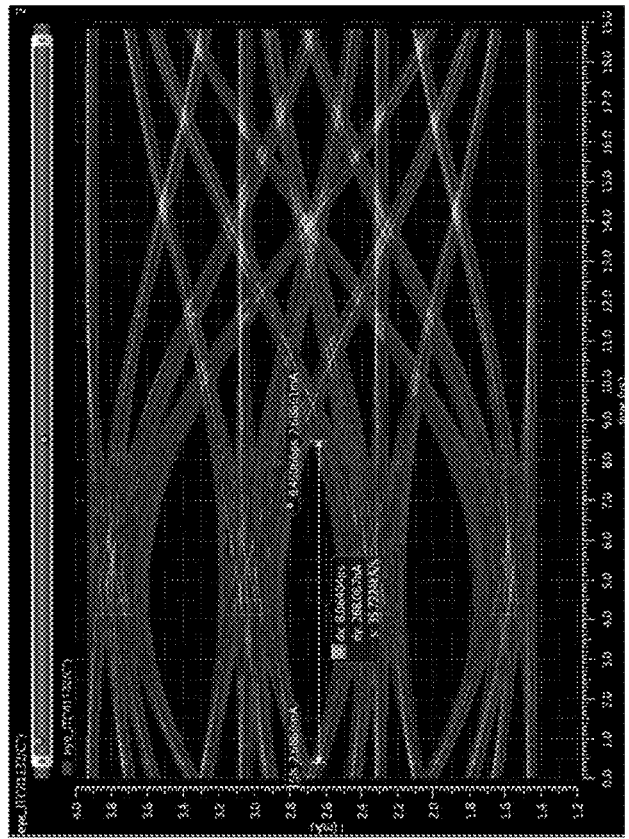

By configuring the delay and inverting the signal in the FFE module 420 via the reversed outputs of the configurable delay into the final delay element 413, and communicating the resulting signal to the final local modulator section 410G, equalization of the signal is enabled, resulting in improved receiver performance as indicated by wider eye patterns, as shown in FIGS. 6 and 7. The implementation of FFE in the transmitter MZI may be used to correct for reference receiver bandwidth restrictions, providing a large transceiver performance advantage.

FIG. 5 illustrates a PAM-4 implementation of a split domain Mach-Zehnder modulator with a feed forward equalizer, in accordance with an example embodiment of the disclosure. Referring to FIG. 5, there is shown a split domain MZI 500 comprising local modulator sections 510A-510H, each comprising a pair of diodes 519A and 519B, and diode drivers 515A-515D. Only the first and last instances of some repeating elements are labeled in FIG. 5 for clarity. The MZI 500 also comprises FFE modules 520A and 520B, each comprising a configurable delay 523 with its outputs inverted before being coupled to delay elements 513.

The MZM 500 is similar to those shown in FIGS. 3 and 4, but with two subsets of local modulator sections, namely local modulator sections 510A-510C with a first input signal, Electrical Signal IN 1, and local modulator sections 510D-510H with a second input signal, Electrical Signal IN 2. This illustrates a split domain MZI with separate NRZ inputs to different sized (i.e., different number of phase modulation sections 510A-510H) portions of the MZI to enable PAM-4 modulation.

Furthermore, each subset of modulator sections, local modulator sections 510A-510C and local modulator sections 510D-510H, is followed by an FFE module 520A or 520B, which each comprise a configurable delay 423 and a delay element 513. In this manner, feed-forward equalization may be incorporated in the split domain MZM 500.

In an example scenario, each of the local domain splitters 509 may generate two voltage domains for controlling the diode drivers 515A-515D, which in turn drive the diodes 519A and 519B in each local modulator section 510A-510H. The voltage domains may be symmetric about a voltage, $V_d$, which in an example scenario may be equal to a voltage of $V_{dd}/2$, thus generating two voltage domains within a supply voltage $V_{dd}$. However, the disclosure is not limited to two voltage domains. Accordingly, any number of voltage domains may be utilized, depending for example on the desired voltage swing of each domain and the total voltage range, defined here as $V_{dd}$ to ground. Similarly, the magnitude of the voltage range in each voltage domain may be a different value than other domains.

The waveguides 511, 511A, and 511B comprise the optical components of the MZM 500 and enable the routing of optical signals around the CMOS chip 130. The waveguides 511, 511A, and 511B comprise for example silicon and silicon dioxide, formed by CMOS fabrication processes, utilizing the index of refraction difference between Si and $SiO_2$ to confine an optical mode in the waveguides 511, 511A, and 511B.

The eight sets of diode drivers 515A-515D in the eight modulator sections 510A-510H may comprise circuitry for driving the diodes 519A and 519B, thereby changing the index of refraction locally in the waveguides 511A and 511B. This index change in turn changes the velocity of the optical mode in the waveguides 511A and 511B, such that when the waveguides merge again into the single waveguide 511 following the driver circuitry, the optical signals interfere constructively or destructively, thus modulating the laser input signal, CW optical IN. By driving the sets of diodes 519A and 519B with a differential signal, where a signal is driven at each terminal of a diode, as opposed to one terminal being tied to AC ground, both power efficiency and bandwidth may be increased due to the reduced voltage swing required in each domain.

The phase calibrator 521 may comprise individually addressable diodes in each waveguide 511A and 511B that may be operable to adjust the phase delay of the optical signal travelling in the waveguides 511A and 511B. The delay elements 513 may comprise CMOS delay elements, such as inverters or buffers, for example, for configuring the time delay of electrical signals to each of the local modulator sections 510A-510H. In the example shown in FIG. 5, the delay elements 513 receive two inputs, Electrical Signals IN 1 and 2, for the two subsets of series-connected delay elements. Other configurations are possible, such as with more inputs and modulator section subsets for higher order modulation, for example.

As described above, the FFE operates by adding a delayed, inverted, weighted copy of a signal back into itself. The delay may typically be 1 UI (T-Spaced) or 0.5 UI (T/2-Spaced), and the net effect is de-emphasis such that the signal looks peaked by the attenuation of the steady state 1/0 level shortly after the transition.

The manner in which the delay is achieved is flexible, as it could be analog or digital delay, but advantageous in that segments of the MZI are used as the modulation/weighting/summing element. Although the FFE may be most readily used in a fixed capacity, variable equalization is possible with this FFE structure, resulting in improved receiver performance as indicated by wider eye patterns, as shown in FIGS. 6 and 7. The implementation of FFE in the transmitter MZI may be used to correct for reference receiver bandwidth restrictions, providing a large transceiver performance advantage.

FIG. 6 illustrates a performance comparison of Mach-Zehnder Interferometer modulators with and without an integrated FFE, in accordance with an example embodiment of the disclosure. Referring to FIG. 6, there are shown eye patterns observed directly out of an MZI, before the low pass filtering response of a receiving photodiode, with the left plot being without FFE and the right plot being with integrated FFE. As shown in FIG. 6, the eye pattern for the MZI with FFE shows a pre-filtered eye (i.e., before going into a TIA which has some bandwidth restrictions). As such the FFE in this case shows up as pre-emphasis.

FIG. 7 illustrates another performance comparison of Mach-Zehnder Interferometer modulators with and without an integrated FFE, in accordance with an example embodiment of the disclosure. Referring to FIG. 7, there are shown eye patterns observed at inputs of a photodiode, the left plot being without FFE and the right plot being with integrated FFE. The FFE MZI shows approximately 1.8 dB improvement in optical modulation amplitude (OMA), net of transmitter dispersion penalty (TDP), and approximately 0.04 UI improvement in horizontal eye opening.

In an example embodiment of the disclosure, a method and system is described for a distributed Mach-Zehnder Interferometer (MZI) with an integrated feed forward equalizer (FFE). The system may comprise a photonic chip comprising an optical modulator with diode drivers, local voltage domain splitters, and delay elements, where each is distributed along a length of the optical modulator. Outputs of the delay elements may be coupled to inputs of the local domain splitters, and outputs of the local voltage domain splitters may be coupled to inputs of the diode drivers. A feed forward equalization (FFE) module comprising a configurable delay element with inverted outputs coupled to one of the delay elements along the length of the modulator, may be coupled to a local voltage domain splitter along the length of the waveguide.

An input electrical signal may be received and delayed using the delay elements. The delayed electrical signals may be coupled to the local domain splitters and input electrical signals for the diode drivers may be generated using the local domain splitters based on the delayed electrical signals. The FFE module may be coupled to a last of the local voltage domain splitters distributed along the optical modulator. Two voltage domains may be generated for the diode drivers using the local voltage domain splitters.

The input electrical signal may comprise a differential signal. The input electrical signal may be delayed using a first subset of the delay elements and a second input electrical signal may be delayed using a second subset of the delay elements. One of the second subset of delay elements may be coupled to a second FFE module. The second FFE module may comprise a second configurable delay element and another one of the second subset of delay elements. Diodes distributed along the optical modulator may be driven using electrical signals generated by the diode drivers.

In another example embodiment of the disclosure, a method and system is described for a distributed Mach-Zehnder Interferometer (MZI) with integrated feed forward equalizer (FFE). The system may comprise a photonic chip comprising an optical modulator with diode drivers, local voltage domain splitters, and delay elements, where each is distributed along a length of the optical modulator. Outputs of the delay elements may be coupled to inputs of the local domain splitters, and outputs of the local voltage domain splitters may be coupled to inputs of the diode drivers. A feed forward equalization (FFE) module comprising a configurable delay element with inverted outputs coupled to one of the delay elements along the length of the modulator, may be coupled to a local voltage domain splitter along the length of the waveguide. The photonic chip may be operable to receive a first input electrical signal, delay the first input electrical signal using a first subset of the delay elements, receive a second input electrical signal, delay the second input electrical signal using a second subset of the delay elements, couple the delayed electrical signals to local domain splitters coupled to corresponding delay elements, and generate input electrical signals for the diode drivers using the local domain splitters based on the delayed electrical signals.

While the present disclosure has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
providing a first input electrical signal in a photonic chip comprising an optical modulator, wherein the optical modulator comprises:
a feed forward equalization (FFE) module comprising a configurable delay element with inverted outputs coupled to a delay element, wherein an output of the FFE module is coupled to a voltage domain splitter;
delaying the first input electrical signal using and the FFE module;
coupling the delayed electrical signal to the voltage domain splitter; and
generating a second input electrical signal for a driver in the optical modulator using the voltage domain splitter.

2. The method according to claim 1, wherein the optical modulator comprises a plurality of drivers, a plurality of voltage domain splitters, and a plurality of delay elements, each being distributed along the length of the optical modulator, wherein the FFE module is coupled to a last of the plurality of voltage domain splitters distributed along the length of the optical modulator.

3. The method according to claim 2, comprising generating two voltage domains for the plurality of drivers using the plurality of voltage domain splitters.

4. The method according to claim 1, wherein the first input electrical signal comprises a differential signal.

5. The method according to claim 2, comprising delaying the first input electrical signal using a first subset of the plurality of delay elements and delaying a third input electrical signal using a second subset of the plurality of delay elements.

6. The method according to claim 5, wherein a first one of the second subset of delay elements is coupled to a second FFE module.

7. The method according to claim 6, wherein the second FFE module comprises a second configurable delay element and a second one of the second subset of delay elements.

8. The method according to claim 2, comprising driving diodes distributed along the optical modulator using electrical signals generated by the plurality of drivers.

9. The method according to claim 8, comprising modulating a continuous wave optical signal by varying an index of refraction of waveguides in the optical modulator using the diodes.

10. The method according to claim 1, wherein the photonic chip comprises a complementary metal oxide semiconductor (CMOS) chip.

11. A system for communication, the system comprising:
a photonic chip comprising an optical modulator, wherein the optical modulator comprises:
a feed forward equalization (FFE) module comprising a configurable delay element with inverted outputs coupled to a delay element, wherein an output of the FFE module is coupled to a voltage domain splitter,
the photonic chip operable to:
delay a first input electrical signal using the FFE module;
couple the delayed electrical signal to the voltage domain splitter; and
generate a second input electrical signal for a driver in the optical modulator using the voltage domain splitter.

12. The system according to claim 11, wherein the optical modulator comprises a plurality of drivers, a plurality of voltage domain splitters, and a plurality of delay elements, each being distributed along a length of the optical modulator, wherein the FFE module is coupled to a last of the plurality of voltage domain splitters distributed along length of the optical modulator.

13. The system according to claim 12, wherein plurality of voltage domain splitters is operable to generate two voltage domains for the plurality of drivers.

14. The system according to claim 11, wherein the first input electrical signal comprises a differential signal.

15. The system according to claim 12, wherein a first subset of the plurality of delay elements is operable to delay the first input electrical signal and a second subset of the plurality of delay elements is operable to delay a third input electrical signal.

16. The system according to claim 15, wherein a first one of the second subset of delay elements is coupled to a second FFE module.

17. The system according to claim 16, wherein the second FFE module comprises a second configurable delay element and a second one of the second subset of delay elements.

18. The system according to claim 12, wherein the plurality of drivers are operable to generate electrical signals to drive diodes distributed along the optical modulator.

19. The system according to claim 18, wherein the optical modulator is operable to modulate a continuous wave optical signal by varying an index of refraction of waveguides in the optical modulator using the diodes.

20. A system for communication, the system comprising:
a photonic chip comprising an optical modulator, wherein the optical modulator comprises:
a daisy chain of delay elements disposed along a length of the optical modulator; and
a feed forward equalization (FFE) module comprising a configurable delay element with inverted outputs coupled to a first delay element,
the photonic chip being operable to:
delay a first input electrical signal using the FFE module to output a first delayed detected signal;
delay a second input electrical signal using the daisy chain of delay elements to output a plurality of delayed electrical signals; and
couple the first delayed electrical signal and the plurality of delayed electrical signals to plurality of voltage domain splitters in the optical modulator.

* * * * *

UNITED STATES PATENT AND TRADEMARK OFFICE
CERTIFICATE OF CORRECTION

PATENT NO. : 10,782,543 B2
APPLICATION NO. : 16/005233
DATED : September 22, 2020
INVENTOR(S) : Brian Welch et al.

Page 1 of 1

It is certified that error appears in the above-identified patent and that said Letters Patent is hereby corrected as shown below:

In the Specification

In Column 2, Line 19, delete "and or" and insert -- and/or --, therefor.

In the Claims

In Column 12, Line 48, in Claim 1, after "using" delete "and".

In Column 13, Line 40, in Claim 12, after "along" insert -- the --.

In Column 14, Line 34, in Claim 20, delete "detected" and insert -- electrical --, therefor.

In Column 14, Line 39, in Claim 20, after "to" insert -- a --.

Signed and Sealed this
Tenth Day of November, 2020

Andrei Iancu
*Director of the United States Patent and Trademark Office*